US010915945B2

(12) United States Patent
Metzger

(10) Patent No.: US 10,915,945 B2
(45) Date of Patent: Feb. 9, 2021

(54) METHOD AND APPARATUSES FOR INTELLIGENT TV STARTUP BASED ON CONSUMER BEHAVIOR AND REAL TIME CONTENT AVAILABILITY

(71) Applicant: Sony Interactive Entertainment LLC, San Mateo, CA (US)

(72) Inventor: Erin Metzger, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 253 days.

(21) Appl. No.: 15/690,872

(22) Filed: Aug. 30, 2017

(65) Prior Publication Data

US 2019/0066194 A1 Feb. 28, 2019

(51) Int. Cl.
*G06Q 30/00* (2012.01)
*G06Q 30/06* (2012.01)
*H04N 21/81* (2011.01)
*H04N 21/254* (2011.01)
*A63F 13/338* (2014.01)

(52) U.S. Cl.
CPC ....... *G06Q 30/0641* (2013.01); *A63F 13/338* (2014.09); *G06Q 30/0623* (2013.01); *G06Q 30/0631* (2013.01); *G06Q 30/0633* (2013.01); *G06Q 30/0643* (2013.01); *H04N 21/2542* (2013.01); *H04N 21/812* (2013.01); *A63F 2300/552* (2013.01)

(58) Field of Classification Search
CPC . G06Q 30/0601–0645; G06Q 30/0641; G06Q 30/0623; G06Q 30/0643; G06Q 30/0631; G06Q 30/0633

USPC ........ 705/26.1–27.2, 27.1, 26.61, 26.7, 26.8
See application file for complete search history.

(56) References Cited

U.S. PATENT DOCUMENTS

| | | | |
|---|---|---|---|
| 9,043,826 B1* | 5/2015 | Patil ................. | H04N 21/25891 725/25 |
| 2003/0093790 A1* | 5/2003 | Logan ................... | G06F 16/739 725/38 |
| 2004/0086120 A1* | 5/2004 | Akins, III ............ | G11B 27/034 380/240 |
| 2008/0220869 A1 | 9/2008 | Midgley et al. | |
| 2009/0018898 A1* | 1/2009 | Genen ................ | G06Q 30/0601 705/26.7 |
| 2010/0273553 A1* | 10/2010 | Zalewski ............. | H04N 21/235 463/31 |
| 2012/0324501 A1 | 12/2012 | Klein et al. | |
| 2013/0290141 A1 | 10/2013 | Bhaskar | |

(Continued)

OTHER PUBLICATIONS

Tabuchi, Hiroko. YouTube Heads Deeper Into E-Commerce. Oct. 1, 2015. International New York Times. (Year: 2015).*

*Primary Examiner* — Jeffrey A. Smith
*Assistant Examiner* — Allison G Wood
(74) *Attorney, Agent, or Firm* — John L. Rogitz

(57) ABSTRACT

In one aspect, while watching TV through a computer game application, a user can purchase an advertised using a "hot key" on the game controller item and the purchase and download happens in background so when the user is done with TV she can play a newly purchased game or otherwise use the purchase. The purchase and viewing are all done within a single application. The purchase feature may be enabled only for a master profile in the computer game system so that other users such as children cannot purchase products through the computer game application.

19 Claims, 4 Drawing Sheets

(56) References Cited

U.S. PATENT DOCUMENTS

| | | |
|---|---|---|
| 2013/0303281 A1 | 11/2013 | Argiro |
| 2015/0165328 A1* | 6/2015 | Turland ................ A63F 13/792 463/25 |
| 2016/0239198 A1* | 8/2016 | Shenkler ............ G06Q 30/0601 705/26.7 |

* cited by examiner

METHOD AND APPARATUSES FOR INTELLIGENT TV STARTUP BASED ON CONSUMER BEHAVIOR AND REAL TIME CONTENT AVAILABILITY

FIELD

The application relates to systems and methods for intelligent TV startup based on consumer behavior and real-time content availability.

BACKGROUND

When watching broadcast content such as TV content through a computer game application, advertisements may from time to time be presented. However, to purchase an advertised product or service, the user typically must do so outside the application, which is inconvenient.

SUMMARY

Accordingly, present principles are directed to an apparatus that includes at least one computer storage that is not a transitory signal and that in turn includes instructions executable by at least one processor to enable, through the CGCA, an option to purchase a product and/or service, and to receive from an input device a selection to purchase the product and/or service. The instructions are executable to, responsive to the selection, cause a download of the product and/or service while continuing to enable TV viewing through the CGCA.

The apparatus can include the at least one processor. The computer storage may be implemented in a computer game console. The apparatus can further include a display coupled to the computer game console.

In examples, the selection is received from a computer game controller associated with a computer game console. In specific non-limiting examples, the selection is received responsive to manipulation of a hot key on the computer game controller.

In some implementations, the instructions may be executable to enable purchase of a product and/or service responsive to a first profile in a computer game system being instantiated, but not enable purchase of a product and/or service responsive to a second profile in a computer game system being instantiated. In some examples, TV programming is received through the CGCA via over the top (OTT) broadcast.

In another aspect, a method includes presenting TV programming using a computer game console application (CGCA), and within the CGA, enabling purchase of an advertised product or service.

In another aspect, an apparatus includes a computer game console and a processor in the computer game console ad configured with instructions for executing at least one computer game console application (CGCA) enabling TV programming to be viewed through the CGCA. The apparatus also includes at least one game controller communicating with the computer game console. The processor is configured with instructions to enable, through the CGCA, an option to purchase a product and/or service, and to receive from an input device a selection to purchase the product and/or service. The instructions are executable to, responsive to the selection, cause a download of the product and/or service while continuing to enable TV viewing through the CGCA.

The details of the present application, both as to its structure and operation, can best be understood in reference to the accompanying drawings, in which like reference numerals refer to like parts, and in which:

DETAILED DESCRIPTION

Figure 1:
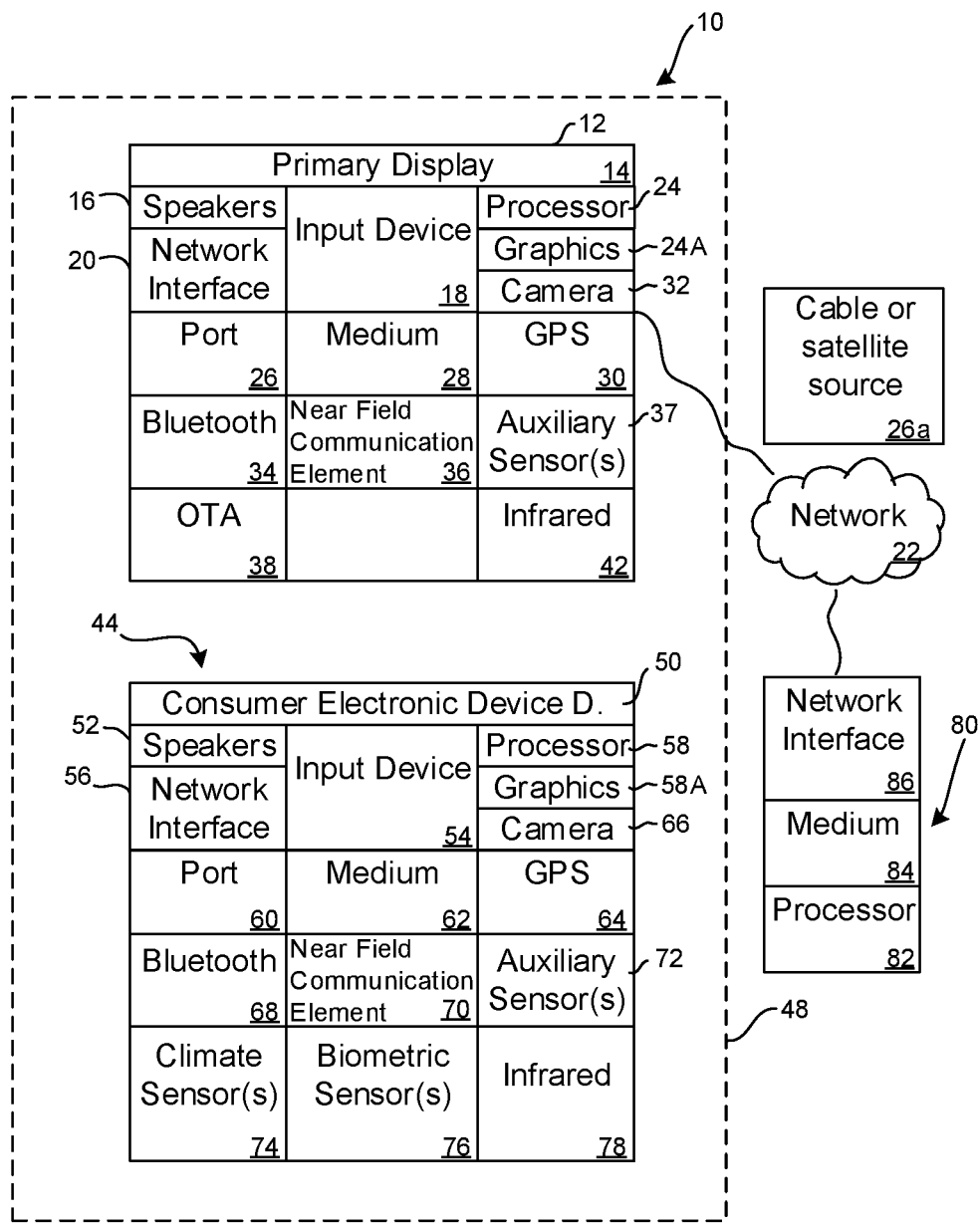
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC)

element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
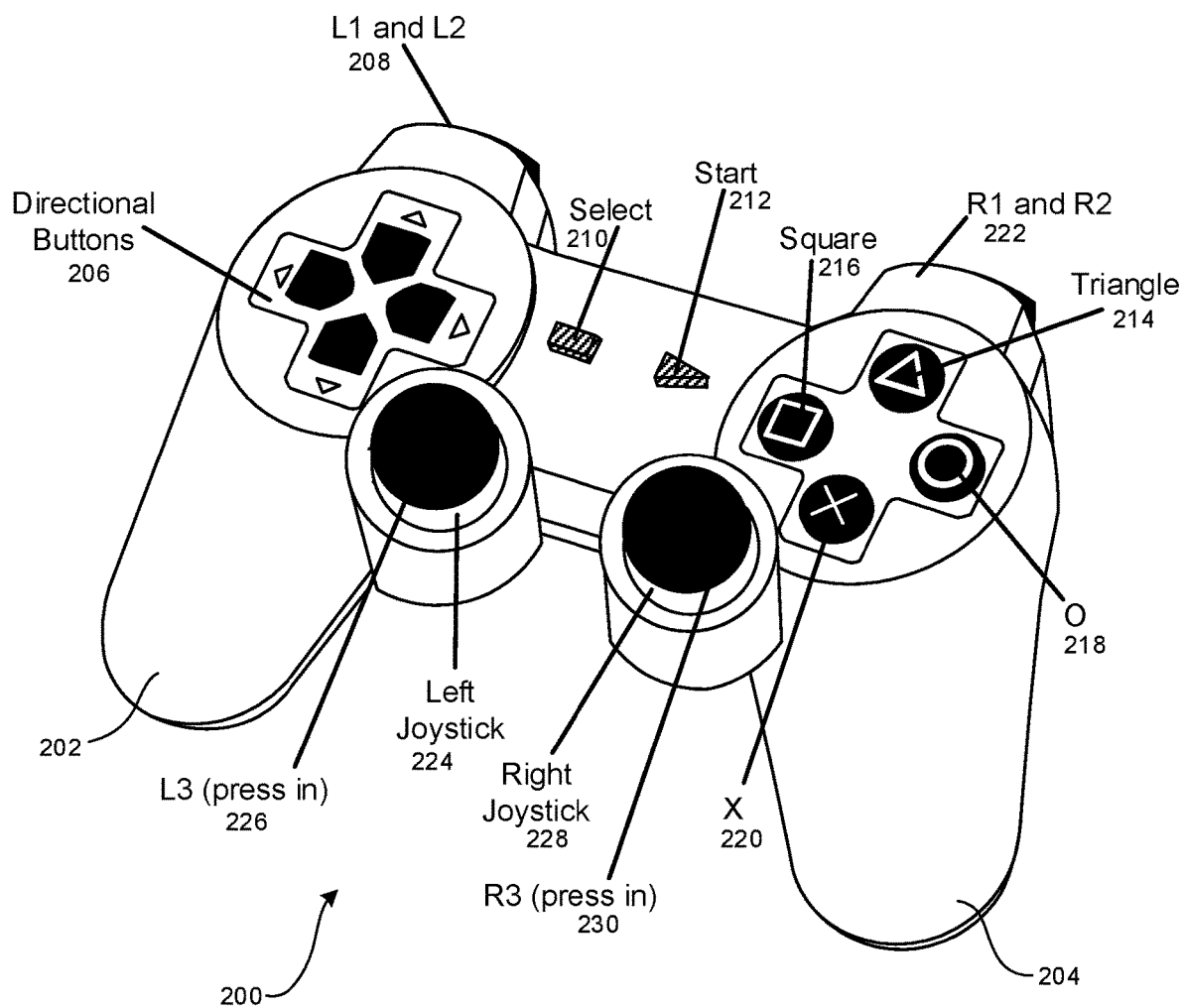
FIG. 2 is a perspective view of an example game controller consistent with present principles.

FIG. 2 shows a controller 200 that includes a lightweight hand-held housing with round, generally cylindrically-shaped left and right handles 202, 204, each defining a top surface on which four manipulable keys disposed thereon. For example, four directional keys 206 are arranged in a cruciform pattern on the top of the left handle 202. The keys 206 can be used to cause an object to move in the respective direction on a display.

Additional L1 and L2 keys 208 may be provided just forward of the left handle 202. A bridge connects the handles 202, 204 and a select key 210 may be disposed on the bridge along with a start key 212.

The four keys on the right handle 204 may include a triangle key 214, a square key 216, and "O" key 218, and an "X" key 220, each of which may assume a respective function according to the game designer's wishes. Additional R1 and R2 keys 222 may be provided just forward of the right handle 204.

Also, between the handles 202, 204 a left joystick 224 may be provided just inboard of the left handle 202. The left joystick 224 may include a depressible top 226. Likewise, a right joystick 228 may be provided just inboard of the right handle 204. The right joystick 228 may include a depressible top 230.

Any of the keys shown in FIG. 2 may function as a "hot key" to purchase products/services while watching TV from within a computer game console application (CGCA) without leaving the CGA according to description below.

Figure 3:
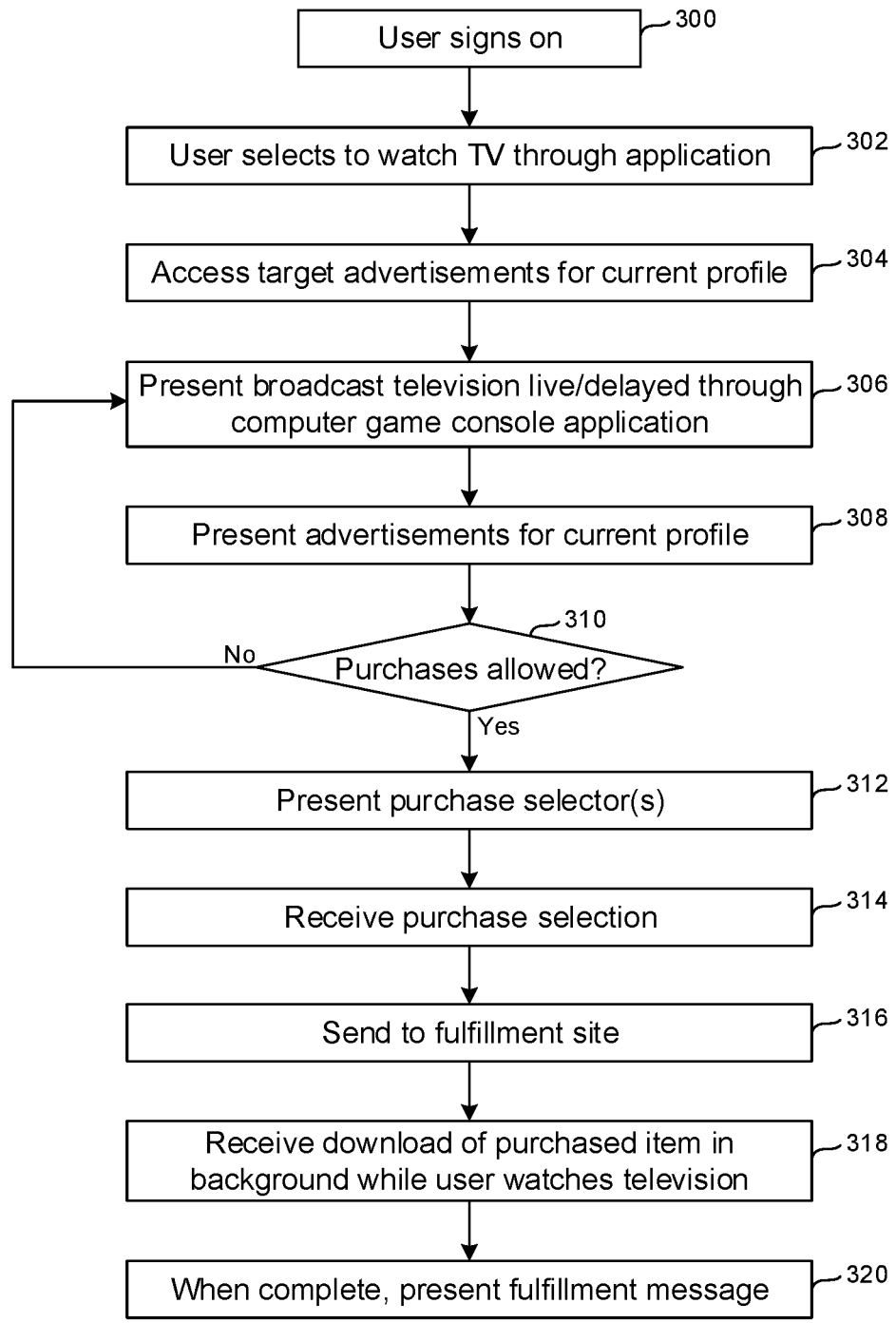
FIG. 3 is a flow chart of example logic consistent with present principles.

Indeed, and now referring to FIG. 3 for logic that may be executed by, for example, one or more processors of a computer game console, at block 300 a user of game console such as but not limited to a PlayStation® console. Moving to block 302, the user may select to enter a TV viewing mode through a computer game console application (CGCA) such as but not limited to PlayStation Vue™. If desired, the user's profile for the purpose of presenting targeted advertising may be accessed at block 304.

At block 306, broadcast TV, either live or in some case recorded on a local storage device such as a digital video console or the game console, is presented by the game console via the CGCA on a display such as the display 14 of the AVD 12 described in FIG. 1, with which the game console communicates via wired or wireless communication paths. In some examples, the TV is received by the CGCA via over the top (OTT) broadcasting.

Advertisements targeted for the user who signed on at block 300 may be presented at block 308. If desired, at decision diamond 310 it may be determined whether the user account is authorized to purchase items. If not, the logic loops back to block 306. However, if the user account is authorized to purchase items (as typically would be the case with a parental master account), the logic flows to block 312 to present purchase selectors or otherwise enable the purchase logic following.

At block 314, any purchase selections input by the user are received. Input may be by means of hovering a cursor over an advertisement and/or associate purchase selector as discussed further below and selecting a designated hot key on the game controller, such as the example game controller shown in FIG. 2. If desired, a first press of the hot key may result in a prompt being presented on the display to press the key again to confirm, and in such embodiments the purchase selection is identified only when the second key press is identified.

The purchase request may be sent to a fulfillment website at block 316 for receiving a background download of the purchased product or service (such as a new computer game or audio-video program) at block 318 while the user continues to watch TV through the CGCA uninterrupted. When download is complete, at block 320 a fulfillment message may be presented on the display to alert the user that the purchased product and/or service is available for use. Thus, the logic sequence from block 306 through block 320 may all be executed within a single application, the CGCA.

Figure 4:
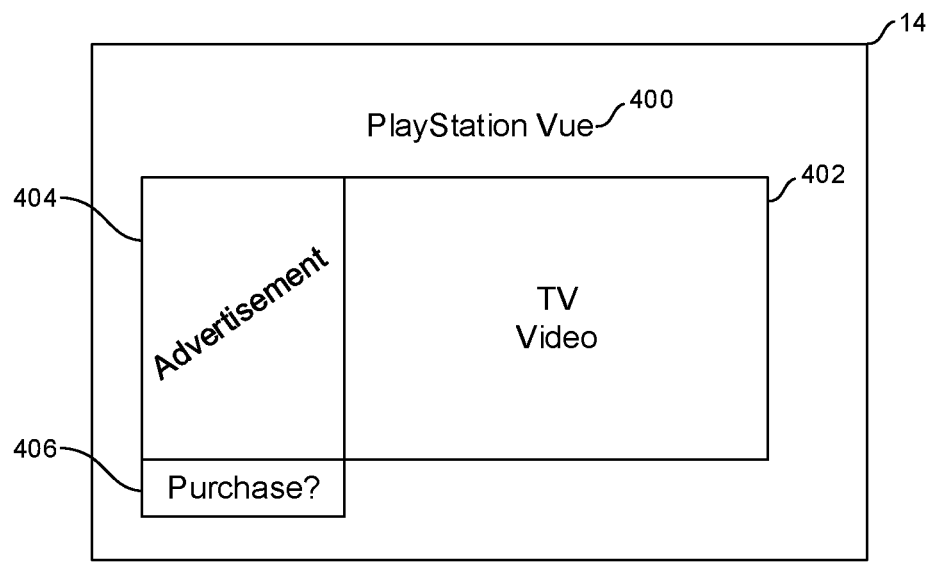
FIGS. 4 and 5 are example screen shots consistent with present principles.

FIG. 4 illustrates principles above. A CGCA name 400 may appear on the display when the user is watching TV through the CGCA in a window 402, which may encompass the entire display. One or more advertisements 404 may be presented on the display according to principles above, and the user may navigate to the advertisement and/or to an associated purchase selector 406 using the game console controller or other navigation device to click on the advertisement, in some implementations using the hot key of the controller.

Figure 5:
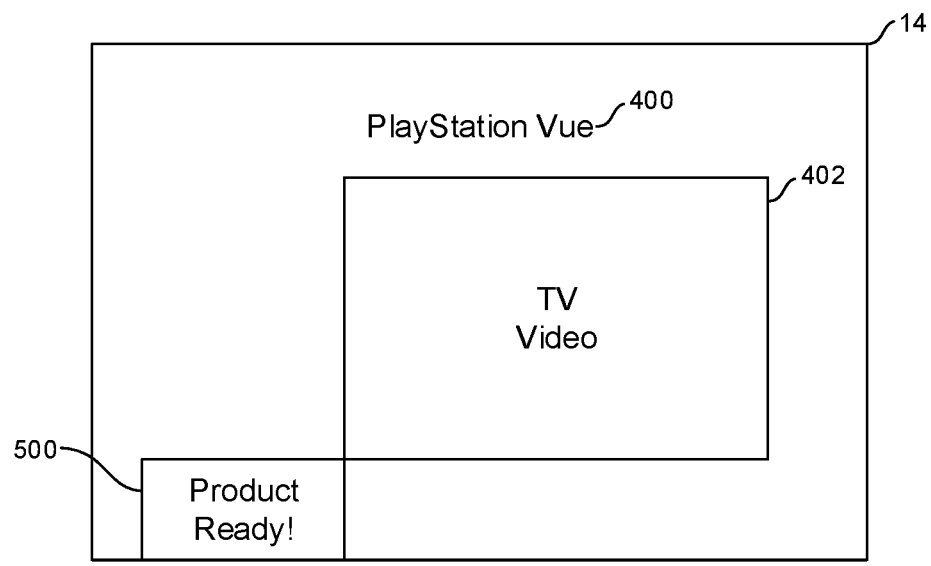

Subsequently, the user continues to watch TV through the CGCA as shown in FIG. 5 as the purchased item is downloaded. When download is complete, a message 500 may be presented to alert the user that the purchase has been fulfilled and the product and/or service is ready for use. If desired, the user may click on the message 500 to access and play the downloaded purchased item using deep links to access the memory location at which the item is stored.

It will be appreciated that whilst present principals have been described with reference to some example embodiments, these are not intended to be limiting, and that various alternative arrangements may be used to implement the subject matter claimed herein.

What is claimed is:
1. An apparatus comprising:
   at least one computer storage that is not a transitory signal and that comprises instructions executable by at least one processor to:

enable viewing TV content on at least one display through a computer game console application (CGCA);
present on the display, through the CGCA, an option to purchase an item;
receive from an input device a selection to purchase the item;
determine that a user associated with the input device is authorized to purchase the item; and
responsive to the selection, cause a download of the item through the CGCA while continuing to enable uninterrupted TV viewing in a video window of the display separate from the option to purchase the item such that no option to purchase graphics impedes viewing TV in the window during download of the item.

2. The apparatus of claim 1, comprising the at least one processor.

3. The apparatus of claim 1, wherein the computer storage is implemented in a computer game console.

4. The apparatus of claim 1, comprising a display coupled to a computer game console associated with the computer game console application.

5. The apparatus of claim 1, wherein the selection is received from a computer game controller associated with a computer game console, the computer game controller comprising at least four directional keys arranged in a cruciform pattern and respectively manipulable to cause at least one object to move in respective directions on the display.

6. The apparatus of claim 5, wherein the selection is received responsive to manipulation of a hot key on the computer game controller.

7. The apparatus of claim 1, wherein the instructions are executable to:
enable purchase of a service, or both a product and a service, responsive to a first profile in a computer game system being instantiated; and
not enable purchase of a service, or both a product and a service, responsive to a second profile in a computer game system being instantiated.

8. The apparatus of claim 1, wherein TV programming is received through the CGCA via over the top (OTT) broadcast.

9. A method, comprising:
presenting TV programming using a computer game console application (CGCA); and
within the CGCA, enabling purchase of an advertised product or service at least in part by:
receiving a first press of a first key;
responsive to the first press, presenting a prompt on a display to press the first key again to confirm;
responsive to receiving a second press of the first key, identifying a purchase selection; and
responsive to receiving a press of a key other than the first key, not identifying a purchase selection; and
determine that a user associated with the press of the keys is authorized to purchase the product or service.

10. The method of claim 9, comprising:
receiving from an input device a selection to purchase the product or service; and
responsive to the selection, causing a download of the product or service while continuing to enable TV viewing through the CGCA.

11. The method of claim 10, wherein the selection is received from a computer game controller associated with a computer game console, the computer game controller comprising at least four directional keys respectively manipulable to cause at least one object to move in respective directions on the display.

12. The method of claim 11, wherein the selection is received responsive to manipulation of a hot key on the computer game controller.

13. The method of claim 9, comprising:
enabling purchase of a service, or both a product and a service, responsive to a first profile in a computer game system being instantiated; and
not enabling purchase of a service, or both a product and a service, responsive to a second profile in a computer game system being instantiated.

14. The method of claim 9, comprising receiving TV programming through the CGCA via over the top (OTT) broadcast.

15. An apparatus, comprising:
an computer game console;
a processor in the computer game console configured with instructions for executing at least one computer game console application (CGCA) enabling TV programming on at least one display to be viewed through the CGCA;
at least one game controller communicating with the computer game console, the game controller comprising at least four directional keys respectively manipulable to cause at least one object to move in respective directions on the display;
wherein the processor is configured with instructions to:
enable, through the CGCA, an option to purchase an item;
receive from an input device a selection to purchase the item;
determine that a user associated with the input device is authorized to purchase the item; and
responsive to the selection, cause a download of the item while continuing to enable TV viewing through the CGCA.

16. The apparatus of claim 15, comprising a TV coupled to the computer game console.

17. The apparatus of claim 15, wherein the selection is received responsive to manipulation of a hot key on the computer game controller.

18. The apparatus of claim 15, wherein the instructions are executable to:
enable purchase of a service, or both a product and a service, responsive to a first profile in a computer game system being instantiated; and
not enable purchase of a service, or both a product and a service, responsive to a second profile in a computer game system being instantiated.

19. The apparatus of claim 15, wherein TV programming is received through the CGCA via over the top (OTT) broadcast.

* * * * *